United States Patent
Kitagawa et al.

(10) Patent No.: US 6,888,592 B2
(45) Date of Patent: May 3, 2005

(54) LIQUID CRYSTAL DISPLAY WIDE VIEWING ANGLE POLARIZING FILM AND LIQUID CRYSTAL DISPLAY WIDE VIEWING ANGLE POLARIZING ADHESIVE FILM

(75) Inventors: Atsushi Kitagawa, Ibaraki (JP); Akira Ootani, Ibaraki (JP); Hisashi Mihara, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/047,528

(22) Filed: Jan. 14, 2002

(65) Prior Publication Data

US 2002/0140882 A1 Oct. 3, 2002

(30) Foreign Application Priority Data

Jan. 23, 2001 (JP) ........................................ 2001-014598

(51) Int. Cl.[7] ............................................. G02F 1/1335
(52) U.S. Cl. .......................................... 349/96; 349/117
(58) Field of Search ................... 349/96, 117; 359/487, 359/491, 494, 500, 583, 584; 428/1.31

(56) References Cited

U.S. PATENT DOCUMENTS

| | | | | |
|---|---|---|---|---|
| 5,220,447 A | * | 6/1993 | Yokokura et al. | ............ 349/119 |
| 6,049,428 A | * | 4/2000 | Khan et al. | .................. 359/491 |
| 6,245,399 B1 | * | 6/2001 | Sahouani et al. | ........... 428/1.31 |
| 6,252,640 B1 | * | 6/2001 | Kim et al. | ..................... 349/96 |
| 6,404,469 B1 | * | 6/2002 | Kitagawa et al. | ............. 349/96 |

FOREIGN PATENT DOCUMENTS

| | | | |
|---|---|---|---|
| EP | 881509 A2 | * 12/1998 | ............ G02B/5/30 |
| EP | 881510 A2 | * 12/1998 | ............ G02B/5/30 |
| EP | 908745 A1 | * 4/1999 | ............ G02B/5/30 |
| EP | 940705 A1 | * 9/1999 | ......... G02F/1/1335 |
| JP | 8-511109 | 11/1996 | |
| JP | 11-101964 | 4/1999 | |
| JP | 2000321426 A | * 11/2000 | ............ G02B/5/30 |
| WO | WO 97/39380 | 10/1997 | |

OTHER PUBLICATIONS

Bobrov et al., Lyotropic Thin Film Polarizers, SID 00 Digest, pp. 1102–1105.*
Hironori Motomura et al., "Application to the Optical Materials of Liquid Crystalline Polymers" Nitto Giho vol. 35 No. 1, May, 1997, pp. 79–84.

* cited by examiner

Primary Examiner—Kenneth Parker
Assistant Examiner—David Chung
(74) Attorney, Agent, or Firm—Westerman, Hattori, Daniels & Adrian LLP

(57) ABSTRACT

A liquid crystal display comprising a liquid crystal display wide viewing angle polarizing adhesion film, which comprising a polarizing layer laminated on an optical compensation film and a retardation film and/or a brightness enhancement film laminated on said polarizing layer, wherein said polarizing layer is directly laminated on said optical compensation film, adhered onto at least one side of a liquid crystal panel, is less brightness nonuniformities.

13 Claims, 1 Drawing Sheet

LIQUID CRYSTAL DISPLAY WIDE VIEWING ANGLE POLARIZING FILM AND LIQUID CRYSTAL DISPLAY WIDE VIEWING ANGLE POLARIZING ADHESIVE FILM

BACKGROUND OF THE INVENTION

1. Field of the Invention

The present invention relates to a liquid crystal display wide viewing angle polarizing film and a liquid crystal display wide viewing angle polarizing adhesion film. Furthermore, the present invention relates to a liquid crystal display in which the liquid crystal display wide viewing angle polarizing adhesion film is adhered to at least one side of a liquid crystal panel.

2. Description of the Prior Art

In view of an picture image-forming method used for a liquid crystal panel of a liquid crystal display, a polarizer are indispensably required to be disposed on a glass substrate that forms the outermost surface of the liquid crystal panel; and generally, a polarizing film is adhered onto the outermost of a liquid crystal panel. Generally, a uniaxially stretched polyvinyl alcohol film in which, for example, iodine and a dichroic dye, are adsorbed is used for the polarizer, and the polarizing has a three-layer structure in which both side surfaces of the polarizer are protected by transparent films such as triacetate cellulose films. Generally, however, since the polarizing film as described above is poor in heat resistance, it is restricted for use in a condition of 80° C. or higher.

In addition to the polarizing film, a variety of optical elements are used for the outermost surface of the liquid crystal panel to improve the display quality of the display. For example, an optical-compensation polarizing film formed by lamination of an optical compensation film onto a polarizing film is used to form a liquid crystal display that achieves a well-viewable property and produces less inplane brightness nonuniformities. The optical compensation film is a liquid crystal layer formed through coating-application of a material having a liquid crystalline property on a support film such as a triacetate cellulose film. In this case, the liquid crystal layer is formed of, for example, a layer in which a discotic liquid crystal is tilt oriented or a layer in which nematic liquid crystal is tilt oriented. Laminating the optical compensation film and the polarizing film via an adhesive produces the optical compensation polarizing film. In addition, a layer on which, for example, a retardation film and a brightness enhancement film, are formed is used on a polarizing film of an optical compensation polarizing film to improve the well-viewable property. Similarly, an adhesive is used for lamination of said retardation film, brightness enhancement film, and the like.

However, said polarizing film has a low heat resistance, and the thickness thereof is ordinarily 100 $\mu$m or larger. As such, window-frame nonuniformity tends to occur because of a stress (distortion) that can occur at the time of heat shrinkage when the polarizing film and the optical compensation film are laminated via the adhesive. Particularly, problems arise in that the brightness nonuniformity increases when the number of laminated layers is increased through the lamination of, for example, the retardation film and the brightness enhancement film on the polarizing layer.

An Object of the present invention is to provide a liquid crystal display wide viewing angle polarizing film that is combined to a retardation film, a brightness enhancement film and that produces less brightness nonuniformities. And an object of the present invention is to provide a liquid crystal display wide viewing angle polarizing adhesion film, and to further provide a liquid crystal display in which the wide viewing angle polarizing adhesion film is adhered onto at least one side of a liquid crystal panel.

SUMMARY OF THE INVENTION

The inventors carried out earnest researches to solve said problems, found that the aforementioned objects can be achieved with a liquid crystal display wide viewing angle polarizing film disclosed hereinbelow, and have completed the present invention.

In specific, the present invention relates to a liquid crystal display wide viewing-angle polarizing film comprising a polarizing layer laminated on an optical compensation film and a retardation film and/or a brightness enhancement film laminated on said polarizing layer, wherein said polarizing layer is directly laminated on said optical compensation film.

In the liquid crystal display wide viewing angle polarizing film of the present invention, since the polarizing layer is directly laminated onto the optical compensation film without using an adhesive, a relaxation can be achieved for a stress occurring because of shrinkage of the optical compensation film (particularly, a support film) during a heat treatment. In addition, even when the retardation film and/or the brightness enhancement film is combined on the polarizing layer, window-frame nonuniformity is prevented from easily occurring, and brightness nonuniformities are reduced.

In the liquid crystal display wide viewing angle polarizing film, the optical compensation film comprises preferably a support film and an optically anisotropic layer formed of a material having a liquid-crystalline property.

The above optical compensation film is effective in achieving a well viewable wide viewing angle and in forming a liquid crystal display that produces less inplane brightness nonuniformities; and in addition, the support film is preferable in forming the polarizing layer.

It is a preferable mode that, in the above liquid crystal display wide viewing angle polarizing film, the polarizing layer is prepared by a lyotropic solution containing a dichroic dye. And it is a preferable mode that, in the liquid crystal display wide viewing angle polarizing film, the polarizing layer is prepared by a liquid-crystal polymer solution containing a dichroic dye.

The polarizing layer of the present invention can be formed through coating application of the polarizing layer forming material; and the polarizing layer can be formed as a thin polarizing layer that has a high heat resistance. Moreover, the liquid crystal display wide viewing angle polarizing film of the present invention including the aforementioned polarizing layer has a wide viewing angle, and is also excellent in antimoisture property, durability, and light weight property.

When the lyotropic solution containing the dichroic dye is used as the polarizing layer forming material, the polarizing layer can be directly laminated, and the polarizing layer having a high heat resistance can be efficiently formed without forming an oriented film on the optical compensation film (particularly, the support film).

In the above liquid crystal display wide viewing angle polarizing film, a thickness of the polarizing layer is preferably in a range of from 0.1 to 15 $\mu$m. Particularly, the thickness of the polarizing layer is preferably in a range of from 0.2 to 3 $\mu$m in polarization property and durability.

The above liquid crystal display wide viewing angle polarizing film preferably comprises a protective layer on a surface of said polarizing layer. Depending on the specification of a liquid crystal display, a rigid surface can be formed on the polarizing layer to prevent occurrence of a scratch that can hinder a viewable property.

Furthermore, the present invention relates to a production method for the liquid crystal display wide viewing angle polarizing film according to claim 1 comprising step of, laminating a polarizing a polarizing-layer through coating-application of a polarizing-layer forming material, and laminating a retardation film and/or a brightness enhancement film onto said polarizing layer.

According to the above method, the polarizing layer can be formed to be as a thin film and to have a light weight, as mentioned above; and furthermore, the liquid crystal display wide viewing angle polarizing film can be produced through lamination of the retardation film and/or the brightness enhancement film thereonto.

Furthermore, the present invention relates to a liquid crystal display wide viewing angle polarizing adhesion film comprising the aforementioned liquid crystal display wide viewing angle polarizing film and an adhesion layer for a glass-substrate surface of a liquid crystal panel. Furthermore, the present invention relates to a liquid crystal display comprising said liquid crystal display wide viewing angle polarizing adhesion film adhered onto at least one side of a liquid crystal panel The liquid crystal display including said liquid crystal display wide viewing angle polarizing adhesion film being adhered has a well viewable wide viewing angle, and produces less brightness nonuniformities.

DETAILED DESCRIPTION OF THE INVENTION

Figure 1:
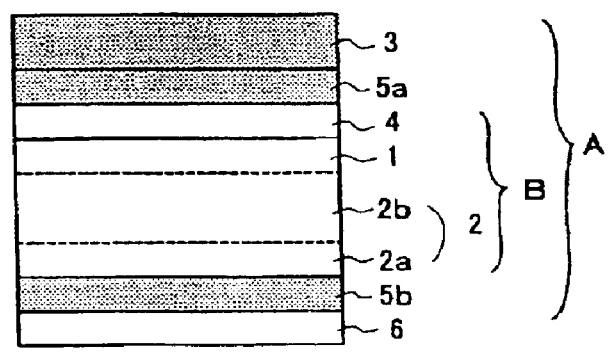
FIG. 1 is a cross sectional view of a wide viewing angle polarizing adhesion film.

As shown in FIG. 1, for example, in a mode of a wide viewing angle polarizing adhesion film, a polarizing layer 1 is laminated on an optical compensation film 2 without an adhesion layer being interposed, and a brightness enhancement film (and/or retardation film) 3 is laminated on the polarizing layer 1. In addition, a protective layer 4 may be provided on the polarizing layer 1. Ordinarily, the brightness enhancement film 3 is laminated on the polarizing layer 1 via an adhesion layer 5a. On the other hand, an adhesion layer 5b is provided on the optical compensation film 2, which is used for a glass-substrate surface of a liquid crystal panel, of the wide-viewing-angle polarizing adhesion film. In addition, a releasable sheet 6 can be provided on the adhesion layer 5b.

Examples of the optical compensation film 2 include a birefringent film formed by uniaxially or biaxially stretching a polymeric film, and a liquid crystal alignment film including an optically anisotropic layer formed of a liquid crystalline material that has birefringence on a support film. While the thickness of the optical compensation film 2 is not specifically limited, it is generally ranged from 5 to 100 μm. Among the example of the optical compensation film 2, a liquid crystal alignment film including an optically anisotropic layer 2a on a support film 2b is preferable. In FIG. 1, while the polarizing layer 1 is laminated on the side of the support film 2b of the liquid crystal alignment film (optical compensation film 2), the lamination on the liquid crystal alignment film of the polarizing layer 1 may also be performed on the side of the optically anisotropic layer 2a.

Usable materials for the polymeric material to form the aforementioned birefringent film include, for example, polyvinyl alcohol, polyvinyl butyral, polymethylvinyl ether, polyhydroxyethyl acrylate, hydroxyethyl cellulose, hydroxypropyl cellulose, methyl cellulose, polycarbonate, polyallylate, polysulfone, polyethylene terephthalate, polyethylene naphthalate, polyethersulphone, polyphenylene sulfide, polyphenylene oxide, polyallylsulfone, polymethyl methacrylate, polyamide, polyimide, polyolefin, polyvinyl chloride, cellulose based polymer, norbornene based resin; or alternatively, various binary or ternary copolymers, a graft polymer, and a blend of the above. These polymeric materials are each formed to be an oriented substance (stretched film). Practical examples of the above include, for example, brands "NRF" and "NRZ" supplied by Nitto Denko Corp.

On the other hand, said support film is formed of a transparent polymer, and an appropriate transparent material may be used. A material having a high transparency, mechanical property, moisture resistance, and the like is preferably used. Although the thickness of the support film is not specifically limited, it is generally ranged from 5 to 50 μm. Usable transparent polymers to form the support film include, for example, polyester based polymers such as polyethylene terephthalate and polyethylene naphthalate, cellulose based polymers such as cellulose diacetate and cellulose triacetate; acrylic based polymer such as polymethyl methacrylate, styrene based polymers such as polystyrene and acrylonitrile/styrene copolymer (AS resins), and polycarbonate polymer. In addition, example polymers to form the transparent protection film include polyethylene, polypropylene, polyolefin having a cyclo based or norbornene structure, a polyolefin based polymer such as an ethylene/propylene copolymer, a vinyl chloride base polymer, a amide based polymers such as nylon and a aromatic-group polyamide, an imide based polymer, a sulfone based polymer, a polyether based polymer, a polyether ether ketone based polymer, a polyphenylene sulfide based polymer, a vinyl alcohol based polymer, a vinylidene chloride based polymer, vinyl butyral based polymer, an allylate based polymer, a polyoxymethylene based polymer, and an epoxy base polymer; or blends of the aforementioned polymers. Among these polymers, cellulose triacetate is preferable.

Usable examples of the liquid crystalline material include various materials of various types, such as a main-chain type and a side-chain type in which, for example, conjugate straight-chained atomic groups (mesogens) inducing orientation are introduced to, for example, a main chain and a side chain of a polymer. Examples of the above include a discotic liquid crystal polymer and a nematic liquid crystal polymer. An optically anisotropic layer using one of these liquid-crystalline polymers is formed such that a liquid crystalline polymer solution is applied onto an oriented face, such as a rubbed surface of a thin film of a polyimide, polyvinyl alcohol, or the like, and a face on which a tilt vapor deposited with silicon oxide; and a heat treatment is then performed. The thickness of the optically anisotropic layer is preferably ranged from 0.1 to 10 μm.

The optical compensation film is preferably formed of a liquid crystal alignment film in which a liquid crystal polymer is oriented on a support film formed of, particularly, a triacetate cellulose film. Examples of the liquid crystal alignment film include a brand "WVA02A" supplied by Fuji Film Co., Ltd.

Suitably usable materials to form the polarizing layer 1 include, for example, a lyotropic liquid-crystal solution containing a dichroic dye, and a liquid-crystalline polymer solution containing a dichroic dye. There are no specific limitations to the lyotropic liquid crystal and a liquid crystalline polymer. The dichroic dye is characterized in that different absorbances are exhibited to a major axis and a minor axis of a molecule for incident light, and the major axis of the molecule is aligned with the predetermined direction to meet the uniaxial orientation of, for example, the liquid crystal polymer, a vibration component in incident light is selectively absorbed and transmitted, and is thereby converted into a polarized light. For the dichroic dye, for example, a compound made to have dichroism in the overall visible wavelength band of incident light can be used; and usable materials thereof include, for example, a disazo based dichroic dye having chenothiazole rings, a trisazo-based dichroic dye having benzothiazole rings, and a specific azo based a dichroic dye. Alternatively, the dichroic dye may be a material exhibiting dichroism only for a specific color and converting specific-color incident light into polarized light. Preferably, the dichroic dye is used by about 1 to 20 wt. % in said solution.

For forming the polarizing layer 1, a solution is prepared in which the aforementioned dichroic dye and one of lyotropic liquid crystal and a liquid-crystalline polymer are dissolved in a solvent. For example, the lyotropic liquid crystal is used as an aqueous solution, and the liquid-crystalline polymer is dissolved in an organic solvent for use as an aqueous solution.

Subsequently, coating of the above-described polarizing-layer forming material (solution) is performed A using an appropriate coating method, such as a casting method or a spin coating method; and heating is performed to form a thin film. The thin film is preferably formed in a range of from 0.1 to 15 $\mu$m. With the lyotropic liquid-crystal solution being used for the polarizing-layer forming material, the optical compensation film 2 need not be subjected to an orienting process. However, with the liquid crystalline polymer being used for the polarizing layer forming material, the optical compensation film 2 is preliminarily subjected to an orienting process. While the orienting process method is not specifically limited, it is performed such that a thin film of a polyimide or polyvinyl alcohol is formed, and the surface of the thin film is subjected to a rubbing process.

Structures, compositions, production methods, and the like regarding suitable dichroic dyes and liquid-crystal polymers are described in detail in, for example, Unexamined Patent Publication No Hei 8-511109; WO 97/39380; "Nitto Giho", Vol. 135, No. 1, p.79 (1997); and Japanese Unexamined Patent Publication No. Hei 11-101964.

The protective layer 4 may be formed on the surface of the polarizing layer 1. The protective layer 4 is provided to form a rigid surface on the polarizing layer to prevent occurrence of a scratch that can reduces visibility. For the rigid material, there are no limitations as long as the material does not provide adverse effects to the optical compensation function. For example, a transparent film may be used to form the protective layer 4. For a material to form the transparent film, the same material of the protective layer 4 used for the optical compensation film may be used. For the transparent film, a triacetate-cellulose film is preferable. Alternatively, the protective layer 4 may be formed of an appropriate crosslinked resin that forms a transparent rigid film. For example, a urethane-acrylate-based or epoxy-based ultraviolet curing resin can be preferably used. Ordinarily, when the protective layer 4 is laminated using a transparent film, the lamination is performed with an adhesive (not shown) being interposed. However, in a configuration wherein the protective layer is formed of the aforementioned crosslinked resin, no adhesive is necessary to laminate the protective layer on the polarizing layer.

For the brightness enhancement film, for example, a material using circularly polarized light of cholesteric liquid crystal is used. Practical examples of the above include a brand "PCF350" supplied by Nitto Denko Corp. and a brand "Transmax" supplied by Merck & Co., Inc. In addition, example materials using linearly polarized light include a brand "D-BEF" supplied by 3M Co., Ltd.

Examples of the retardation film include a birefringent film, which is formed by uniaxially or biaxially stretching a polymeric film, and a liquid crystal polymer film. That is, the same material as that for the optical compensation film may be used.

In addition, appropriate optical layers, such as an antiglare sheet, a diffusion sheet, an antireflection film, and a protective plate, may be appropriately laminated on the surface of the wide viewing angle polarizing film. Moreover, a protective layer, a retardation film, brightness enhancement film, and the like may be combined and formed thereon.

Usable pressure-sensitive adhesives to form the adhesion layers 5a and 5b include various pressure sensitive adhesives, such as, a rubber based pressure sensitive adhesive, an acrylic based pressure sensitive adhesive, and a silicon based pressure sensitive adhesive. Among the above, however, the acrylic based pressure sensitive adhesive is preferably used, of which the base polymer weight average molecular mass is preferably ranged from 300,000 to 2,500,000. The same pressure sensitive adhesive may be used for the other adhesion layers.

For a monomer to be used for acrylic copolymer that is the base polymer of the acrylic-based pressure-sensitive adhesive, various alkyl (metha)acrylate. The mentioned (metha)acrylate refers to acrylate and/or methacrylate. Hereinbelow, (metha) is used in the same meaning. Practical examples of the alkyl (metha)acrylate include methyl (metha)acrylate, ethyl (metha)acrylate, butyl (metha) acrylate, and 2-ethylhexyl (metha)acrylate. The go above may be used either independently or in combination. Among the above, a material using 30 wt. % butyl acrylate is preferable since it can be adjusted in the relaxation modulus to cause the base polymer to exhibit the viscosity.

Moreover, a small amount of (metha)acrylic acid is preferably used instead of a part of the alkyl (metha)acrylate to provide polarities to acrylic-based polymer. Furthermore, glycidyl (metha)acrylate, 2-hydroxyethyl acrylate (metha) acrylate, an N-methylol(metha)acrylamide, and the like may concurrently be used as crosslinked monomers. Still furthermore, when desired, other monomers, such as vinyl acetate and styrene, which is copolymerizable may concurrently be used to an extent that the adhesive properties of the acrylic based polymer is not reduced.

The above-described acrylic based polymers can be produced in various publicly known methods. For example, a radical polymerization method, such as a bulk polymerization method, a solution polymerization method, a suspension polymerization method, can be appropriately selected for use. For an initiator for the radical polymerization method, one of various publicly known azo based and peroxide based materials may be used. Among the aforementioned production methods, the solution polymerization method is preferable because the method ordinarily uses a polar solvent such as ethyl acetate or toluene as a solvent for acrylic based polymer.

For the base polymer of the rubber based pressure sensitive adhesive, usable examples include a natural rubber, an isoprene based rubber, a styrene-butadiene based rubber, a reclaimed rubber, a polyisobutylene base rubber, a styrene-isoprene-styrene based rubber, and a styrene-butadiene-styrene based rubber. For the base polymer of the silicon based pressure sensitive adhesive, usable examples include dimethyl polysiloxane and diphenyl polysiloxane.

The above-described pressure sensitive adhesives preferably contain a crosslinking agent. Examples of the crosslinking agent include, for example, a polyisocyanate compound, a polyamine compound, a melamine resin, a urea resin, and an epoxy resin. Furthermore, a tackifier, a plasticizer, a filler, an antioxidant, an ultraviolet absorber, and a silane coupling agent may be appropriately used without departing from the intended scope of the present invention.

The adhesion layer 5b is formed on a glass substrate surface of the liquid crystal panel of the wide viewing angle polarizing film. In FIG. 1, the glass substrate surface corresponds to the surface opposing the surface on which the polarizing layer 1 of the optical compensation film 2 is laminated. A forming method of the adhesion layer 5b is not specifically limited. Examples of the method include a method in which the pressure-sensitive adhesive (solution) is applied onto the glass substrate surface of the wide viewing angle polarizing film, and curing is performed; in addition, examples of the method includes a method in which transcription is performed using the releasable sheet 6 on which the adhesion layer 5b is provided. A method that is similar to the method of forming the adhesion layer 5b can be employed for the other adhesion layers. While the thickness of each of the adhesion layers 5a and 5b (cured film thickness) is not specifically limited, it is preferably ranged from 10 to 40 μm.

Usable materials to form the releasable sheet 6 include paper and synthetic resins, such as, polyethylene, polypropylene, and polyethylene terephthalate. As needs arise, treatments, such as a silicon treatment, a long-chain alkyl treatment, and fluorine treatment, may be applied onto the surface of the releasable sheet 6 to improve the property of releasing from the adhesion layer 5.

A liquid crystal display can be formed according to a conventional method. The wide-viewing-angle polarizing adhesion film may be one side or both sides of the liquid crystal panel. In addition, an illumination system using a backlight or a reflector may be appropriately formed.

EXAMPLES

Hereinbelow, the present invention will be described in detail with embodiments. However, the present invention is not limited thereby.

Production Example 1

A liquid crystal alignment film ("WV" film supplied by Fuji Film Co., Ltd.) using a triacetate cellulose film as a support film was used as an optical compensation film. A lyotropic liquid crystal solution ("LCPolarizer" supplied by Optiva Inc.; solid content concentration: 8.7 wt. %) containing a dichroic dye was applied on the side of the support film of the optical compensation film by using a wire bar (No. 7), and curing was performed at 80° C. Then, a polarizing layer having a thickness of 1.3 μm was formed. Thereby, an optical compensation film including the polarizing layer was obtained. The optical-compensation polarizing film was measured for the thickness, and the thickness was 110 μm; and the simplicial transmittance was 40%, and the polarization degree was 90%. In this case, the values of simplicial transmittance and the polarization degree are the results of measurement performed with a spectrophotometer "DOT-3" supplied by Murakami Color Research Laboratory.

Production Example 2

A liquid crystal alignment film ("WV" film supplied by Fuji Film Co., Ltd.) using a triacetate cellulose film as a support film was used as an optical compensation film. A polyvinyl alcohol layer was provided on the side of the support film of the optical compensation film; and in addition, a rubbing treatment as described above was performed.

A solution was uniformly prepared by mixing a side chain type polymer (26 weight part) as express by the following formula 1, a dye "G-202" (0.37 weight part) supplied by K.K. Nihon Kankoshikiso Kenkyusho, a dye "G-207" (0.73 weight part) supplied by the same company, a dye "G-429" (1.46 weight parts) supplied by the same company, and tetrachloroethane (100 weight parts).

(Formula 1)

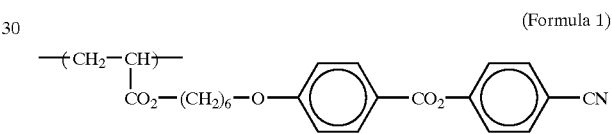

Using a spin coating method, the aforementioned solution was applied onto a rubbing treatment layer of the optical compensation film. Thereafter, a heat treatment was performed at 100° C., said liquid-crystal polymer was oriented, and a polarizing layer having a thickness of 1.5 μm was formed. Thereby, the optical compensation film having the polarizing layer was obtained.

In addition, a urethane-acrylate-based resin as expressed by the following formula 2 was applied on the polarizing layer.

(Formula 2)

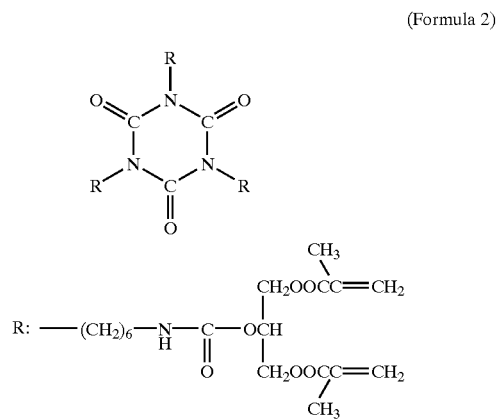

Thereafter, ultraviolet curing was performed. Thus, a protective layer made of a crosslinked resin having a thickness of 5 μm was formed. The optical-compensation polarizing film was measured for the thickness, and the thickness was 115 μm; and the simplicial transmittance was 38%, and the polarization degree was 88%.

Embodiments 1 and 2

A brightness enhancement film ("PCF350" supplied by Nitto Denko Corp.) was adhered to each of the optical compensation polarizing films produced in Production Examples 1 and 2 via an adhesion layer (acrylic based pressure sensitive adhesive). Thereby, a wide-viewing-angle polarizing film according to the present invention was obtained.

(Brightness Nonuniformities)

Figure 2:
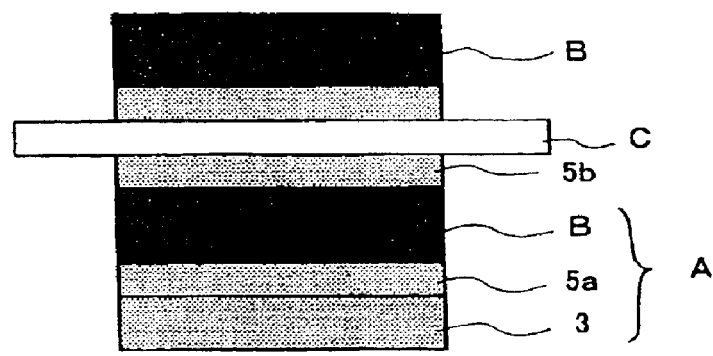
FIG. 2 is a conceptual view of a sample for measuring brightness nonuniformities.
Figure 3:
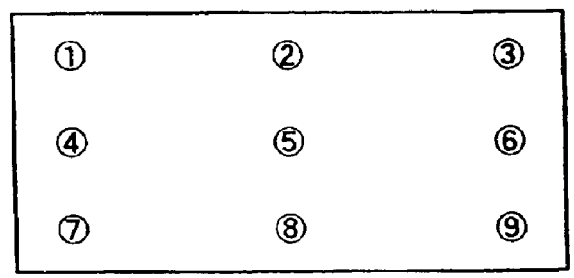
FIG. 3 shows transmittance measurement portions of the sample for measuring brightness nonuniformities.

As shown in FIG. 2, the side of the optical compensation film of the wide viewing angle polarizing film A obtained in the embodiment was adhered onto one surface of a glass plate C (1.1 mm) via the adhesion layer 5b (acrylic resin based pressure sensitive adhesive) having a thickness of 25 μm. In addition, the side of the optical compensation film of the optical-compensation polarizing film B obtained in the production example was adhered onto the other surface of the glass plate C via an adhesion layer (acrylic resin based pressure sensitive adhesive) having a thickness of 25 μm. Thus, the films were adhered to the glass plate to have a crossed Nicols relationship.

The adhered films was kept at 80° C. for 24 hours; and thereafter, nine portions in a plane (230 mm (in length)×310 mm (in width)) were measured for the transmittance (luminance meter "BM-5" supplied by Topcon Corp.), and the difference between the maximum value of the transmittance (%) and the minimum value thereof was obtained. The results are shown in Table 1.

Comparative Example 1

A polarizing plate (215 μm thick; supplied by Nitto Denko Corp.) was prepared. Then, an optical compensation film ("WV" film supplied by Fuji Photo Film Co., Ltd.) and a brightness enhancement film (PCF350 supplied by Nitto Denko Corp.) were individually adhered onto two surfaces of the polarizing plate via adhesion layers (acrylic resin based pressure sensitive adhesive) each having a thickness of 25 μm. Thus, a wide viewing angle polarizing film was obtained. The brightness nonuniformities were obtained using the obtained wide viewing-angle polarizing films. The results are shown in Table 1. A film prepared by adhering the aforementioned optical compensation film onto one surface of the aforementioned polarizing plate was used as the optical-compensation polarizing film B.

TABLE 1

| | Brightness Nonuniformity (%) Maximum Value − Minimum Value | Maximum Value of Transmittance (%) | Minimum Value of Transmittance (%) |
|---|---|---|---|
| Embodiment 1 | 2.3 | 6.5 | 4.2 |
| Embodiment 2 | 2.3 | 6.5 | 4.2 |
| Comparative Example | 5.5 | 9.5 | 4.0 |

What is claimed is:

1. A production method for a liquid crystal display wide viewing angle polarizing film comprising a polarizing layer laminated on an optical compensation film and a retardation film and/or a brightness enhancement film laminated on said polarizing layer, said method comprising steps of:

directly laminating a polarizing layer through coating-application of a polarizing-layer forming material onto an optical compensation film without using an adhesive, and laminating a retardation film and/or a brightness enhancement film onto said polarizing layer.

2. The method according to claim 1, wherein said optical compensation film comprises a support film and an optically anisotropic layer formed of a material having a liquid-crystalline property.

3. The method according to claim 1, wherein said polarizing layer is prepared by a lyotropic solution containing a dichroic dye.

4. The method according to claim 1, wherein said polarizing layer is prepared by a liquid-crystal polymer solution containing a dichroic dye.

5. The method according to claim 1, wherein a thickness of said polarizing layer is in a range of from 0.1 to 15 μm.

6. The method according to claim 1, wherein comprising a protective layer on a surface of said polarizing layer.

7. A production method for a liquid crystal display wide viewing angle polarizing adhesion film comprising applying an adhesion layer for a glass-substrate surface of a liquid crystal panel to a liquid crystal display wide viewing angle polarizing film produced by the method according to claim 1.

8. A production method for a liquid crystal display comprising adhering a liquid crystal display wide viewing angle polarizing adhesion film produced by the method according to claim 7 onto at least one side of a liquid crystal panel.

9. The method according to claim 1, wherein a thickness of the polarizing layer is from 0.2 to 3 microns.

10. The method according to claim 9, wherein a retardation film is laminated on said polarizing layer.

11. The method according to claim 9, wherein a brightness enhancement film is laminated on said polarizing layer.

12. The method according to claim 9, wherein a retardation film is laminated on said polarizing layer.

13. The method according to claim 9, wherein a brightness enhancement film is laminated on said polarizing layer.

* * * * *